United States Patent [19]
Cohen et al.

[11] Patent Number: 5,723,524
[45] Date of Patent: Mar. 3, 1998

[54] METHOD FOR PREVENTING OR RETARDING THE FORMATION OF GAS HYDRATES

[75] Inventors: Jeffrey M. Cohen, Fairlawn; Philip F. Wolf, Bridgewater; William D. Young, Bloomingdale, all of N.J.

[73] Assignee: ISP Investments Inc., Wilmington, Del.

[21] Appl. No.: 743,696

[22] Filed: Nov. 6, 1996

[51] Int. Cl.⁶ .................................. C07C 7/20; C03K 5/04
[52] U.S. Cl. .......................... 524/376; 585/15; 585/950; 137/3; 137/13
[58] Field of Search .................. 524/376; 585/15, 585/950; 137/3, 13

[56] References Cited

U.S. PATENT DOCUMENTS 4,302,220  11/1981  Volkamer et al. .................. 55/32

FOREIGN PATENT DOCUMENTS

WO 95/32356   11/1995   WIPO.

*Primary Examiner*—Jeffrey T. Smith
*Attorney, Agent, or Firm*—Walter Katz; Marilyn J. Maue; Joshua J. Ward

[57] ABSTRACT

A composition for preventing or retarding the formation of gas hydrates or for reducing the tendency of gas hydrates to agglomerate, during the transport of a fluid comprising water and a hydrocarbon, through a conduit, comprising, (a) a polymer or copolymer selected from a terpolymer of vinyl pyrrolidone, vinyl caprolactam and an ammonium derivative monomer having from 6 to 12 carbon atoms, selected from the group consisting of dialkyl aminoalkyl methacrylamide, dialkyl dialkenyl ammonium halide and a dialkylamino alkyl acrylate or methacrylate, a copolymer of vinyl pyrrolidone and vinyl caprolactam, and a homopolymer of vinyl caprolactam, and (b) a low molecular weight glycol ether containing an alkoxy group having at least 3 carbon atoms.

25 Claims, No Drawings

METHOD FOR PREVENTING OR RETARDING THE FORMATION OF GAS HYDRATES

BACKGROUND OF THE INVENTION

1. Field of the Invention

The invention relates to a method for preventing or retarding the formation of gas hydrates or for reducing the tendency of such hydrates to agglomerate during the transport of a fluid comprising water and a hydrocarbon through a conduit, and, more particularly, to the addition of a mixture of a polyvinyl pyrrolidone or caprolactam polymer and a glycol ether to the fluid to inhibit such gas hydrate formation.

2. Description of the Prior Art

It is well known in the art that the formation of gas hydrates in a conduit, e.g. a pipeline, during the transport of liquids, such as oil, and gases, particularly lower hydrocarbons, e.g. methane, ethane, propane, butane, isobutane and natural gas is a serious problem, especially in areas with a low temperature in the winter season or in the sea. Generally the temperatures are so low that gas hydrate formation, due to the inevitable presence of co-produced water in the wells takes place, if no special steps are taken. Insulation decreases the chance of gas hydrate formation; however, if the field is relatively small and far away from the production platform, the costs of using insulation are too high to make such field economically attractive. It is also known to add anti-freeze compounds, for example, glycol or methanol, during transport to minimize gas hydrate formation; however, large quantities of these compounds are required to be effective which is expensive. Alkyl glycosides also have been used for this purpose.

A representation of the prior art in this field are the following patents: U.S. Pat. Nos. 5,420,370; 5,432,292; 4,915,176; EPA 0526929A1; EPO 0323774A1; Can. Pat. Appln 2,073,577; WO 93/25798; WO 95/17579; Gas Hydrates and Hydrate Prevention 73 GPA Annual Convention, pgs 85–93; WO 96/08456; WO 96/08636; WO 93/25798; EPA 0457375A1; WO 9412761.

SUMMARY OF THE INVENTION

What is described herein is a composition for effectively preventing or retarding the formation of gas hydrates, or for reducing the tendency of gas hydrates to agglomerate, during the transport of a fluid comprising water and a hydrocarbon, through a conduit, comprising, (a) a polymer or copolymer of vinyl pyrrolidone (VP) and/or vinyl caprolactam (VCL), preferably a terpolymer of vinyl pyrrolidone, vinyl caprolactam and an ammonium derivative monomer having from 6 to 12 carbon atoms, selected from the group consisting of dialkyl aminoalkyl methacrylamide, dialkyl dialkenyl ammonium halide and a dialkylamino alkyl acrylate or methacrylate, or a vinyl caprolactam homopolymer, and (b) a low molecular weight glycol ether containing an alkoxy group having at least 3 carbon atoms.

In one embodiment of the invention, the polymer component of the inhibitor composition is a terpolymer of vinyl pyrrolidone, vinyl caprolactam and a dialkylaminoalkyl acrylate or methacrylate.

DETAILED DESCRIPTION OF THE INVENTION

Suitable terpolymers for use in the composition of the invention are described in detail by Lorenz et al. in U.S. Pat. No. 4,521,404. A preferred terpolymer is Gaffix® VC-713, which is sold by International Specialty Products, Wayne, N.J. Gaffix® VC-713 is a terpolymer of 17–32% vinyl pyrrolidone, 65–80% vinyl caprolactam and 3–6% dimethylaminoethyl methacrylate, by weight.

Another preferred polymer which exhibits inhibitory characteristics in the composition of the invention is a homopolymer of vinyl caprolactam (VCL).

Generally, the polymer is used in an amount of about 30 to 50% by weight of the composition, i.e. in admixture with the glycol ether solvent. The polymer inhibition concentration in the pipeline, i.e. the aqueous phase is about 0.1 to 3% by weight; the solvent inhibition concentration accordingly, is about 0.1 to 5% by weight in the aqueous phase.

Low molecular glycol ethers which are effective in providing the advantageous gas hydrate inhibition contain an alkoxy group having at least 3 carbon atoms. Representative glycol ethers are butyl cellosolve, which is ethylene glycol monobutyl ether; propylene glycol butyl ether; butyl carbitol or di(ethylene glycol) monobutyl ether; and 2-isopropoxyethanol.

The following examples are provided to illustrate the invention.

GENERAL METHOD

The gas hydrate inhibition tests were conducted in a 300 ml stainless steel stirred autoclave at high pressure and low temperature. In a typical experiment, 0.25 to 1.0 wt % of the inhibitor composition was added to 120 g of a 3.5 wt % sea salt solution. The resulting mixture was transferred to the 300 ml autoclave and immersed in a constant temperature bath at 4° C. The pressure was then increased to 1000 psig with green canyon gas and held constant to within about 5 psi throughout the experiment with a programmable syringe pump. After the pressure reached 1000 psig, the autoclave stirrer was turned on to 1000 rpm. The gas volume, as measured by the syringe pump, the gas pressure, and the fluid temperature were measured and electronically recorded at 1 minute intervals throughout the experiment. Gas consumption indicates hydrate formation.

The results are shown below in Table 1. An extended inhibition time e.g. 350 minutes or greater, preferably 500 to >1200, is indicative of a composition which provides the desired gas hydrate inhibition. Standard and comparative results are shown in Table 2.

TABLE 1

| Composition | | Inhibition |
|---|---|---|
| Polymer* | Solvent** | Time (min) |
| Gaffix ® VC-713 | Butyl Cellosolve | >1200 |
| VCL | Butyl Cellosolve | >1200 |
| Gaffix ® VC-713 | 2-Isopropoxy ethanol | 800 |
| Gaffix ® VC-713 | Butyl Carbitol | 500 |
| Gaffix ® VC-713 | propylene glycol propyl ether | 600 |
| Gaffix ® VC-713 | propylene glycol butyl ether | 450 |
| Gaffix ® VC-713 | ethylene glycol monopropyl ether | 350 |
| VP/VCL (50:50) | Butyl Cellosolve | 350 |

*0.5 wt %
**0.75 wt %

TABLE 2

| | | |
|---|---|---|
| None | None | 0 |
| None | Butyl Cellosolve | 0 |
| Gaffix ® VC-713 | None | 2 |
| Gaffix ® VC-713 | Ethanol | 43 |
| VCL | Methanol | 0 |
| VCL/VP | Methanol | 0 |
| Ganex ® P904 | Butyl Cellosolve | 50 |
| Gaffix ® VC-713 | Carbitol | 0 |
| Gaffix ® VC-713 | Cellosolve | 10 |

While the invention has been described with particular reference to certain embodiments thereof, it will be understood that changes and modifications may be made which are within the skill of the art. Accordingly, it is intended to be bound only by the following claims, in which:

What is claimed is:

1. A composition for preventing or retarding the formation of gas hydrates or for reducing the tendency of gas hydrates to agglomerate, during the transport of a fluid comprising water and a hydrocarbon, through a conduit, comprising, (a) a polymer or copolymer selected from the group consisting of a terpolymer of vinyl pyrrolidone, vinyl caprolactam and an ammonium monomer having from 6 to 12 carbon atoms, selected from the group consisting of dialkyl aminoalkyl methacrylamide, dialkyl dialkenyl ammonium halide and a dialkylamino alkyl acrylate or methacrylate, a copolymer of vinyl pyrrolidone and vinyl caprolactam, and a homopolymer of vinyl caprolactam, and (b) a glycol ether containing an alkoxy group having at least 3 carbon atoms.

2. A composition according to claim 1 wherein said terpolymer includes an ammonium monomer which is dimethylaminoethyl methacrylate.

3. A composition according to claim 1 wherein said terpolymer comprises, by weight, about 17–32% vinyl pyrrolidone, about 65–80% vinyl caprolactam and about 3–6% of said ammonium monomer.

4. A composition according to claim 1 wherein said copolymer comprises vinyl pyrrolidone and vinyl caprolactam.

5. A composition according to claim 1 wherein said polymer is a homopolymer of vinyl caprolactam.

6. A composition according to claim 1 wherein said glycol ether is ethylene glycol monobutyl ether.

7. A composition according to claim 1 wherein said glycol ether is di(ethylene glycol) monobutyl ether.

8. A composition according to claim 1 wherein said glycol ether is 2-isopropoxyethanol.

9. A composition according to claim 1 wherein said glycol ether is propylene glycol propyl ether.

10. A composition according to claim 1 wherein said glycol ether is propylene glycol butyl ether.

11. A composition according to claim 1 wherein said glycol ether is ethylene glycol monopropyl ether.

12. A composition according to claim 1 wherein said polymer comprises about 30 to 50% by weight of said composition.

13. A method of preventing or retarding the formation of gas hydrates or for reducing the tendency of gas hydrates to agglomerate, during the transport of a fluid comprising water and a hydrocarbon, through a conduit which comprises including a composition comprising (a) a polymer or copolymer selected from the group consisting of a terpolymer of vinyl pyrrolidone, vinyl caprolactam and an ammonium monomer having from 6 to 12 carbon atoms, selected from the group consisting of dialkyl aminoalkyl methacrylamide, dialkyl dialkenyl ammonium halide and a dialkylamino alkyl acrylate or methacrylate, a copolymer of vinyl pyrrolidone and vinyl caprolactam, and a homopolymer of vinyl caprolactam, and (b) a glycol ether containing an alkoxy group having at least 3 carbon atoms to said fluid.

14. A method according to claim 13 wherein said terpolymer includes an ammonium monomer which is dimethylaminoethyl methacrylate.

15. A method according to claim 13 wherein said terpolymer comprises, by weight, about 17–32% vinyl pyrrolidone, about 65–80% vinyl caprolactam and about 3–6% of said ammonium derivative monomer.

16. A method according to claim 13 wherein said polymer is a homopolymer of vinyl caprolactam.

17. A method according to claim 13 wherein said copolymer comprises vinyl pyrrolidone and vinyl caprolactam.

18. A method according to claim 13 wherein said glycol ether is ethylene glycol monobutyl ether.

19. A method according to claim 13 wherein said glycol ether is 2-isopropoxyethanol.

20. A method according to claim 13 wherein said glycol ether is di(ethylene glycol) monobutyl ether.

21. A method according to claim 13 wherein said glycol ether is propylene glycol propyl ether.

22. A method according to claim 13 wherein said glycol ether is propylene glycol butyl ether.

23. A method according to claim 13 wherein said glycol ether is ethylene glycol monopropyl ether.

24. A method according to claim 13 wherein said polymer comprises about 30 to 50% by weight of said composition.

25. A method according to claim 13 wherein said polymer or copolymer inhibition concentration in the conduit is about 0.1 to 3% by weight.

* * * * *